United States Patent [19]

Cheale et al.

[11] 4,198,904

[45] Apr. 22, 1980

[54] BALING MACHINE

[75] Inventors: Daniel Cheale; Bryce E. Randall; Eric T. Martin, all of Bury St. Edmunds, England

[73] Assignee: Howard Machinery Limited, Bury St. Edmunds, England

[21] Appl. No.: 954,765

[22] Filed: Oct. 25, 1978

[30] Foreign Application Priority Data

Oct. 29, 1977 [GB] United Kingdom ............... 45131/77
Jul. 19, 1978 [GB] United Kingdom ............... 30369/78

[51] Int. Cl.² ............................................. B30B 9/30
[52] U.S. Cl. ...................................... 100/45; 56/343;
100/4; 100/7; 100/19 R; 100/50; 100/250;
100/100
[58] Field of Search .................... 56/341, 343, 346;
100/4, 250, 100, 17, 18, 19, 215, 7, 189, 45, 50,
191, 218

[56] References Cited

U.S. PATENT DOCUMENTS

| | | | |
|---|---|---|---|
| 2,552,888 | 5/1951 | Druetta | 100/189 |
| 3,552,109 | 1/1971 | Murray | 56/343 |
| 4,022,002 | 5/1977 | Sweeney | 56/341 |
| 4,022,004 | 5/1977 | Henke | 56/346 |
| 4,034,543 | 7/1977 | Voth | 56/341 |
| 4,037,528 | 7/1977 | White | 100/191 |
| 4,118,918 | 10/1978 | White | 100/50 X |
| 4,126,089 | 11/1978 | Oosterling | 100/250 |

*Primary Examiner*—Billy J. Wilhite
*Attorney, Agent, or Firm*—Wegner, Stellman, McCord, Wiles & Wood

[57] ABSTRACT

A baling machine for making large rectangular bales of straw or hay has a bale chamber with an entry opening at one end. Material is fed under compression to the entry opening to fill the chamber. So that the bale is formed of consolidated columns of material a guide is located adjacent the entry opening and can be moved in and out of the chamber after each column is formed.

Pivoting of the guide pushes completed columns along the chamber to make way for incoming material.

10 Claims, 3 Drawing Figures

BALING MACHINE

This invention relates to baling machines and in particular to baling machines whereby crops, such as straw and hay, and other materials are compressed and formed into bales.

For many years hay and straw have been baled into small rectangular bales which can be manhandled for stacking and transportation. To make the handling of baled crops more efficient and speedy, baling machines capable of making large bales have been introduced. Of these machines many have been of the kind in which the formed bale is of cylindrical shape. Such cylindrical bales have disadvantages among which are that they are not easily stackable and air permeability is low making drying of material in the bale difficult. U.S. Pat. No. 3,552,109, owned by applicants' assignee, describes a baling machine which makes large rectangular bales which do not suffer from these disadvantages and the machine is capable of high work-rates to produce large bales which are efficiently handled. The machine has achieved considerable commercial success as the Howard Bigbaler but in certain applications the relatively low and uneven density of the bales has been a disadvantage.

The machine of the above patent applications has a baling chamber in which the bales are formed and an entry opening at one end of the bale chamber. The material to be baled is fed through the entry opening and is simultaneously compressed in bundles which accumulate in the bale chamber. Over at least part of the baling cycle little consolidation of the bundles in the chamber takes place because of the lack of effective constraint on movement of the bundles. The bundles adopt a somewhat random orientation in the chamber and much of the compression imparted during feeding is lost due to the resiliance of the material.

One solution to this problem has been proposed in U.S. Pat. Nos. 4,034,543 and 4,037,528 and the baler described therein employs a plunger movable in the bale chamber to successively compress the incoming batches of material against material already in the chamber. To effect compression of all the material in the chamber in this way involves imparting a large force on the plunger which acts on a large mass of material occupying the chamber. Such a machine requires a large power unit and is very expensive.

There have also been other recent attempts to produce large size packages of crop material, such as for example described in U.S. Pat. Nos. 4,022,004 and 4,022,002 but these do not produce compacted dense bales which can be bound to provide efficient mechanical handling.

An object of the invention is to improve the machine of said U.S. Pat. No. 3,552,109 by providing effective constraint to the incoming material so that it adopts a predetermined position in the chamber without the compression imparted during feeding being dissipated. The present invention seeks to achieve this object without a major increase in the cost of the machine or in the power requirement while producing bales having significantly higher overall density.

According to the invention a baling machine comprises a frame defining a bale chamber in which bales are to be formed, an entry opening at one end of the bale chamber, feed means for feeding material to be baled through the entry opening and for compressing the material during feeding, guide means locatable in the bale chamber adjacent the entry opening for constraining the material entering the chamber to pass along a wall of the chamber at said one end to form successive columns of the material, and drive means for moving the guide means in and out of the bale chamber so that when the guide means is positioned out of the bale chamber a column of material which lies against said wall can move towards the opposite end of the chamber, and upon re-entry of the guide means into the chamber the guide means is positioned between said wall and said column of material.

In this way the packing plate located above the entry opening as described in U.S. Pat. No. 3,552,109 can be dispensed with as the material in the columns remains consolidated as the columns are formed and material entering the chamber causes the previously formed columns to be consolidated with one another without any force in addition to that applied during feeding needing to be applied.

Preferably the guide means is supported for limited movement away from said wall of the bale chamber after re-entry into the chamber and conveniently the guide means is pivotably supported for said limited movement to take place by engagement of incoming material with the guide means, the guide means lying across the entry opening prior to said limited movement.

According to a further feature of the invention the entry opening is formed in a lower side wall of the chamber towards one end thereof, the completed columns of material passing along said lower side with their lower ends supported thereby as successive columns are formed. Alternatively it would be possible for the entry opening to be formed in an upper side wall of the chamber in which case it would be more readily possible for the lower side wall to be inclined upwardly away from the entry opening instead of downwardly as in the preferred embodiment to be described.

Said opposite end of the bale chamber may be constituted by a discharge door closable to form an abutment during formation of the bales, the door being opened upon completion of a bale for discharge of the bale from the chamber and the discharge door may be pivotably mounted about its lower edge to move to an intermediate position in which the completed bales can be supported on the door, and a downwardly inclined discharge position in which the bales can slide off the door. In this way a completed bale is not discharged as soon as it is completed but it acts as an abutment for the bale being formed over at least part of the baling cycle. The completed bale is retained partially in the bale chamber and partly supported by the discharge door until the bale being formed is almost completed upon which the completed bale is discharged and the door closed to act as the abutment over the final stages of bale formation.

In use as a pick up baler for crops such as straw the frame is mounted for travel over the ground and the entry opening may be at the lower forward side of the bale chamber so that the wall of the chamber against which new columns are formed is at the forward end of the chamber and the columns extend in a generally vertical direction.

Further features of the invention will appear from the following description of an embodiment of the invention given by way of example only and with reference to the drawings, in which.

Figure 1:
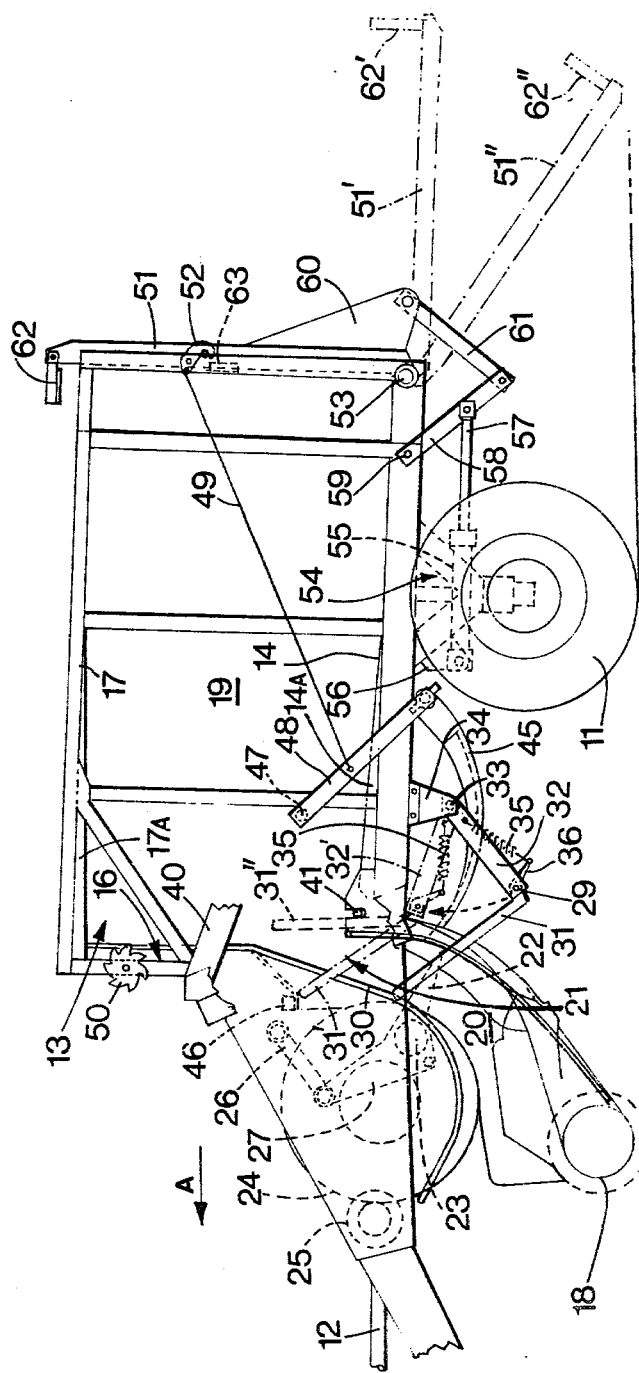
FIG. 1 is a side elevation of a baling machine, partly in section, and showing the feed means, guide means and knotting mechanism but omitting the drive means and actuating means for the guide means, for clarity.

Referring to the drawings, the baling machine is in the form of a mobile frame mounted on a pair of wheels 11 and arranged to be drawn behind a tractor (not shown) in the direction of arrow A. The tractor also provides drive for the machine which is transmitted through the tractor power take-off to a transmission shaft 12 and from the tractor hydraulic pump for hydraulically-operated components of the machine.

The frame defines a bale chamber 13 which has a floor 14, a front wall 16, a roof 17 and side walls 19. The floor 14, the roof 17 and, optionally, the side walls 19 are shaped at 14A and 17A so that over the leading end the bale chamber tapers outwardly to the rear so as to assist the rearward movement of material in the chamber. It will also be seen that the bale chamber is inclined downwardly to the rear.

The feed means for feeding material into the chamber includes a pick-up reel 18 of known form which is located below and in advance of the front end of the chamber 13 and which picks up material to be baled from the ground and passes it into the lower end of a duct 20 extending upwards and rearwards towards the bale chamber. The duct 20 extends across the full width of the chamber 13 and opens into the chamber across an entry opening 21 in the form of a narrow slot at the forward end of the floor of the chamber adjacent the front wall 16. It will be seen that at its lower end the duct 20 has a relatively wide opening and converges to provide a narrow opening or throat as the duct approaches the chamber. The walls of the duct 20 are formed by parallel bars spaced to provide openings to admit means which can enter the duct, as will be described.

A row of packing fingers 22, spaced apart across the duct 20, also constituting part of the feed means, are movable in the duct 20 to feed charges or bundles of material from the pick-up reel 18 along the duct to the opening 21 and into the bale chamber and in doing so the material is put under compression so that it emerges into the chamber in a compressed bundle.

The packing fingers 22 are pivotally mounted on a transverse shaft 23 mounted between two wheels 24 in driving engagement with a transmission arrangement 25 from the input shaft 12. The fingers 22 are each connected to a pivoted link 26 through an integral arm 27 and the drive arrangement for the fingers ensures that the movement of the fingers is upwards along the duct 20 during an operative feeding operation. The fingers effect a downwards and forwards movement to withdraw from the chamber just after entry into the chamber, a return movement to reposition the fingers clear of the lower end of the duct and then an upward and rearward movement to recommence a feeding operation of the fingers. Operation of the fingers is continuous throughout the operation of the baler.

The front wall 16 of the chamber, over its lower portion, and the front wall of the duct is formed of transversely-spaced channel-section members 30 between which the fingers 22 extend, the openings in the channels being directed rearwardly.

A row of guide members 31, spaced apart across the duct and between the fingers 22, act in conjunction with the packing fingers during the feeding of material into the bale chamber 13. The members 31 are each in the form of a tine pivotally mounted on a transverse pin 29 carried on an arm 32 which is in turn mounted on a transverse rotatable shaft 33 supported between brackets 34. The members 31 are each spring-urged by respective springs 35 towards the positions shown at 31 and 31', the springs 35 each acting between an arm 36 carried on the tine 31 and the associated arm 32. The tines 31 are pivotable against the action of the springs 35 to a position 31" in which the tines are in an upright position. This compares with the positions of the tines at 31 and 31' when they extend forwards. The arms 32 are movable on rotation of the shaft 33 between a lowered position, shown in full lines in FIGS. 1 and 2 and a raised position 32', the tines 31 being operative in the latter position to guide and constrain the incoming material upwards from the duct 20 along the front wall 16. Rotation of the shaft 33 is brought about in timed sequence with the operation of the fingers 22 by drive means to be described with reference to FIG. 2.

Each of the tines 31 engages at its free end in a channel-section member 30 so that the tine is supported by the channel member, when at positions 31 and 31', against any downward pressure on the tines by material at the outlet from the duct. When the tines 31 have reached the position 31" further movement of the tines relative to the arms 32 is prevented by a stop bar 41 which locates along the rear sides of the tines. The stop bar 41 may be located in vertical slots to move and rotate in such slots and provide for more ready withdrawal of the tines.

The feeding and loading action of the machine is as follows. The material to be baled is picked up by the pick-up reel 18 and transferred to the leading end of the duct 20. The packing fingers 22 push a charge of material along the duct 20 and due to the convergence of the duct compression of the material takes place. Assuming the tines 31 are initially at 31' the incoming charge of material pushes the tines aside to the rear to position 31 so that the material enters the bale chamber. Withdrawal of the fingers 22 from the chamber to return to a position clear of the lower end of the duct 20 takes place near the opening 21 so that the charge or bundle is released at this point and the packing fingers move round to transfer and compress a further bundle. This enters the chamber below the previous bundle and therefore pushes it up the front wall 16 of the chamber 13, rearward movement of the bundle, at least over the lower part of the chamber, being prevented by the tines 31 which are in the position 31". Successive bundles increase the column of bundles being formed until the first reaches the roof 17 of the chamber. A sensor 50, to be described, detects the presence of the top of the column and initiates withdrawal of the tines 31 from the chamber as the fingers 22 clear the lower end of the duct 20, by means to be described, to lower the arms towards the full line position 32 during which movement the tines 31 are held in a rearward position by the column. When fully lowered the tines move forward to the full line position 31 under the action of the springs 35 and are then moved upwards for reinsertion to the position 31' before the fingers re-enter the duct so that the tines are now in advance of the formed column and adajcent the front wall 16 and ready to help start forming a further column. When the first bundles of the further column enter the chamber they are pushed against the tines which in turn move rearwards pushing the previous column towards the rear of the chamber. Towards the upper part of the chamber above the upper ends of the tines the column being formed pushes along the previously formed column to effect rearward movement of the upper part of the column. Thus the upward pressure of the incoming material is partially translated into rearward pressure which helps to maintain the previously formed columns consolidated and under pressure and causes rearward movement of the baled material. It has been found that the tines 31 need not normally extend the full height of the chamber, as shown.

Figure 2:
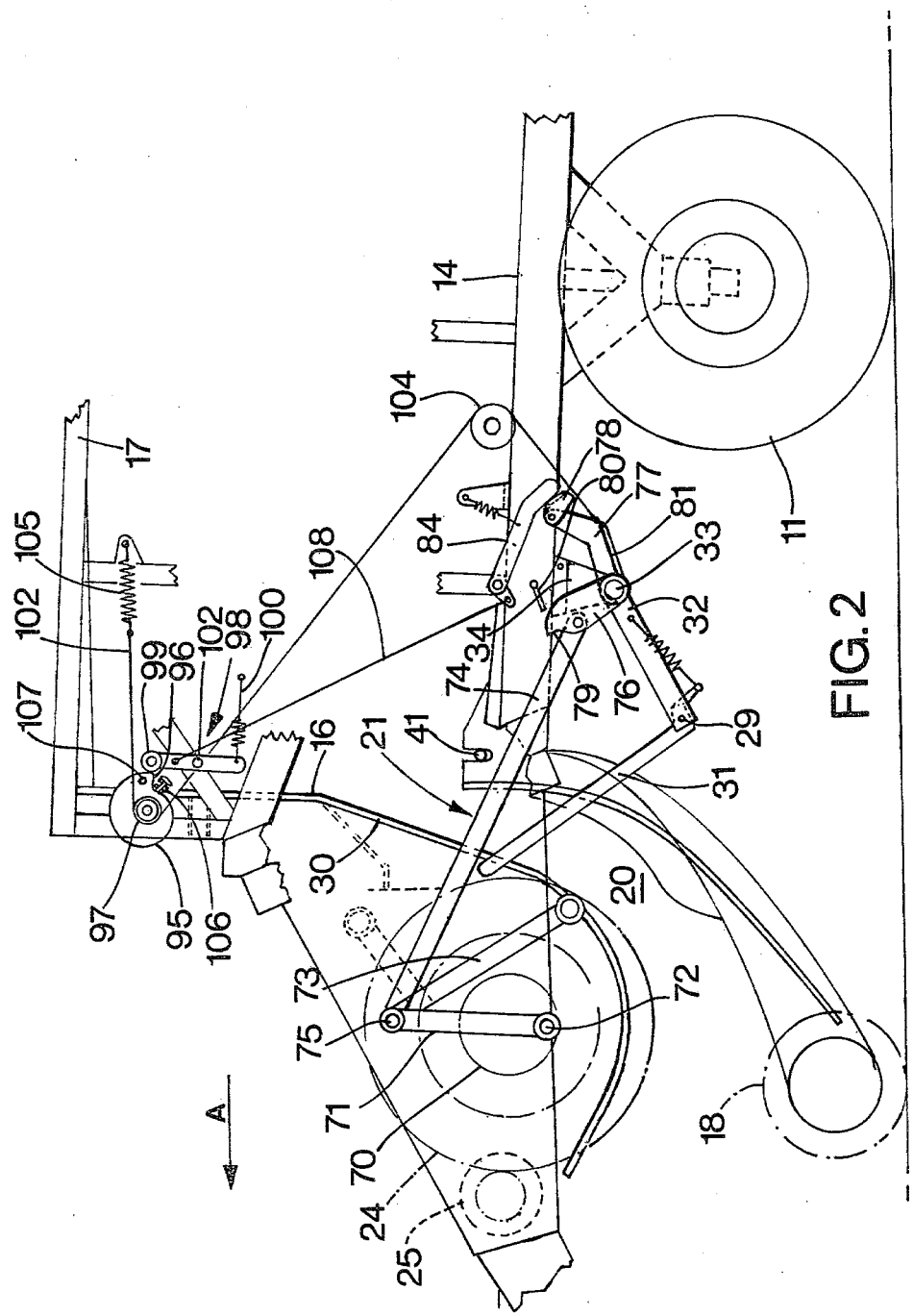
FIG. 2 is a fragmentary side elevation corresponding to FIG. 1, to a larger scale, and showing the drive means for the guide means and its actuating means.

Still referring to FIG. 1 there is now described the rear end of the chamber at which is located a tail gate or door 51 constituting a rear end of the bale chamber 13 when closed, as shown in full lines in FIG. 1. In the closed position the tail gate is secured by latches 52 at the upper end, the lower side of the tail gate being pivotally mounted on pivots 53 so that when the latches 52 are released the tail gate pivots downwards under gravity or under power to a position 51' or 51", the tail gate being generally horizontal in position 51', and inclined downwardly with its rear edge adjacent or in contact with the ground in position 51". Raising of the gate is achieved by a single or double-acting ram or rams 54 hydraulically powered by the tractor and mounted under the rear end of the bale chamber. The ram cylinder 55 is pivotally mounted on a bracket 56 on the frame and the end of the piston rod 57 is pivotally connected to a beam 58. The beam 58 is pivotally mounted on the rear end of the frame about a pivot 59 and a link 61 is pivotally attached at its ends to the free end of the beam 58 and a mounting bracket 60 secured to and extending outwardly from the tail gate 51. Thus when the ram 54 is extended it pushes on the beam 58 which in turn causes the link 61 to push on the bracket 60 and raise the tail gate to the position shown in full lines, for latching. In this position the tail gate acts as an abutment for the rear end of a bale in the chamber and the material in the chamber is consolidated as rearward-pressure comes onto the tail gate. A pressure detector 63 of known form is mounted at the centre of the tail gate and when this senses a predetermined pressure by the baled material the latches 52 can be released to lower the gate to the position 51' and the bale begins to emerge from the bale chamber. In practice the detector 63 provides a signal which actuates a knotting sequence whereby the completed bale is bound with twine, as will be described, and the latches 52 are released during the knotting sequence by a cable 49.

Emergence of the completed bale from the chamber takes place under the pressure exerted on the front end of the bale by the formation of a new bale so that the completed bale provides an abutment for the rear side of the new bale and continues to do so as the completed bale moves backwards over the tail gate in position 51'. When the rear end of the completed bale approaches the end of the tail gate which is when the new bale approaches the rear end of the bale chamber this is detected by a trip mechanism 62 which transmits a signal to actuate the ram 54 to move the tail gate and to lower it further to the position 51" whereupon the completed bale slides down towards the ground and is discharged. As soon as the bale engages the ground it is rapidly dragged off the tail gate 51 so that the gate is free to be returned to a latched position by operation of the ram 54, before the rear end of the bale being formed interferes with closing of the gate.

As mentioned each bale is individually bound with twine and the binding means includes knotters 46 and needles 45 corresponding to the number of lengths of twine used, in this case three. Each length of twine is fed from a reel (not shown) and passes through a needle 45 around the bale during its formation and to the associated knotter. The twine passes along the underside of the bale from the needle 45, up the rear of the bale, along the top side and partially down the front of the bale to the knotter 46. When the bale is complete and a knotting operation is required the needles are moved through an arc about a pivot 47 at one end of arms 48 carrying the needles 45 in the same manner as that described in U.S. Pat. No. 3,552,109. The needles 45 engage with the knotters 46 to effect the knotting operation and then return to their illustrated position leaving lengths of twine extending between the needles and knotters and across the opening 21 for the next bale, all as described in said U.S. patent. During travel to the knotters, the needle movement actuates release of the tail gate latches 52 through cable 49 to cause the tail gate to be lowered to position 51'. Throughout the knotting operation movement of the packing fingers 22 continues but it will be appreciated that the knotting operation is performed during one cycle of the fingers.

Figure 3:
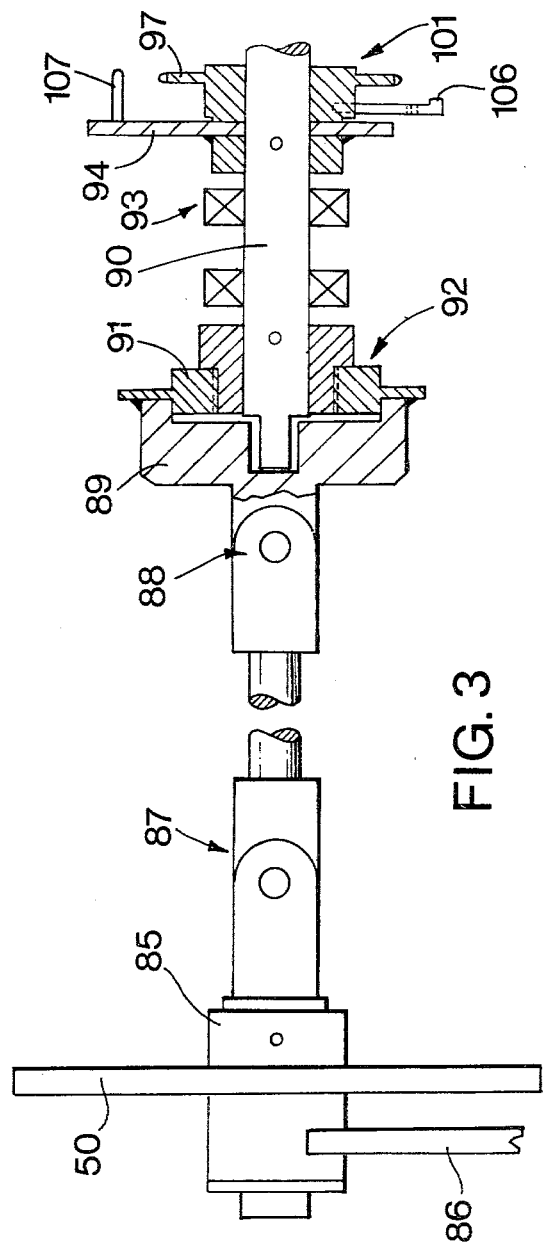
FIG. 3 is an end elevation of part of the actuating mechanism for the guide means.

It will be understood that a close relationship exists between the movement of the packing fingers 22, the tines 31 and the needles 45 and to achieve this the drives from each of these parts are arranged to give the desired sequence and are taken from a common input. For a clearer understanding of how this is achieved, we refer now particularly to FIGS. 2 and 3 in which the drive to the tines 31 and the actuating means for the drive are illustrated.

The drive means for the tines 31 is taken from one of the wheels 24 which carries a drum 70 rotatable therewith. The drum 70 carries a link 71 pivotally mounted at one end about a pivot 72 eccentrically located on the drum. At the other end of the link 71 the ends of two further links 73 and 74 are pivotally located about a pivot 75, the other end of the link 73 being pivotally mounted on the frame, and the link 74 extending rearwards for pivotal attachment to an arm 76. The arm 76 is mounted to freely pivot about the axis of the shaft 33 on which the tines 31 are carried but when the tines are to be lowered and raised, the arm 76 is locked to a further arm 77 secured to the shaft 33 for rotation therewith.

It will be seen that as the wheel 24 rotates continuously during the operation of the machine, the linkage including the links 71, 73 and 74 is moved to effect a rocking motion of the arm 76 and the movement of the arm 76 is slower in the forward direction than in the reverse direction, which directions correspond to withdrawal and insertion of the tines 31, respectively. However it is only when the arm 76 is locked to the arm 77 that the tines are raised and lowered. Locking together of the arms 76 and 77 is achieved by a pawl 78 pivotally carried at the upper end of the arm 77 and spring urged by an over centre device in one direction away from the upper end of the arm 76. When the pawl 78 is moved downwards against the spring its free end moves into the path of the upper end of the arm 76 so that when the arm 76 moves rearwards the pawl engages a surface 79 of the arm 76 and locks the arms 76 and 77 together. The arms move together for one forward and rear stroke of the arm 76 thereby effecting one downward and one upward movement of the tines 31. After the end of the forward movement the pawl 78 is disengaged from the surface 79 by movement towards its other end position through engagement with a pawl return device 80, the arm 77 being returned rearwards by engagement of the arm 76 at its rear side with a ledge 81 formed on the arm 77.

The pawl 78 is moved to a locking position with the arm 76 by engagement by a pivotal arm 84, the arm 84 being spring-urged away from engagement with the pawl and being movable to engage with the pawl 78 on actuation of the tine moving mechanism.

Actuation of the tine movement is achieved according to movement of a sensor 50 which is in the form of a star wheel rotatable on engagement by the upwardly moving columns of bundles. The wheel 50 is carried on a shaft 85 (FIG. 3) which is supported on a spring-loaded arm 86 biased towards the bale chamber. The shaft 85 transmits rotation of the wheel 50 through universal joints 87 and 88 to a yoke 89 rotatable about a further shaft 90 and fixed to the outer part 91 of a free wheel device 92 so that the wheel 50 will drive the shaft 90 in one direction only. The shaft 90 is carried in bearings 93 and carries a cam disc 94 having an outer cam profile 95 with a reduced diameter portion 96. A chain sprocket 97 is rotatably carried on the shaft 90.

A lever arm 98 with a cam follower 99 engaging the cam profile 95 is spring-urged towards the cam disc 94 by a spring 100, the lever 98 being pivotable about a pivot 102. A cable 108 extends from the lever 98 adjacent the follower 99 to the arm 84 so that when the arm 98 moves towards the cam 94 the arm 84 is pivoted to move the pawl 78 to a position in which the arms 76 and 77 can be locked together.

As soon as the arm 77 is moved forwards after being locked to the arm 76 the sensor 50 is reset ready to detect a further movement of a column in the chamber. This is achieved by a chain 102 attached at one end to the rear side of the arm 77, passing round a pulley 104 mounted on the frame, and around the sprocket 97, for the other end of the chain to be connected to the frame through a tension spring 105. Thus as the arm 77 moves forward the sprocket 97 and thereby the cam disc 94, are rotated through a predetermined angle to reset the cam disc to its original position. The sprocket 97 rotates the disc 94 by engagement of an arm 106 with a pin 107 carried on the side of the disc 94, the arm being rotatable with the sprocket 97 and being arranged to be engageable with the pin 107 in one direction of rotation only. During rotation of the sprocket and disc, it will be appreciated that the wheel 50 does not rotate due to the free wheel device 92. Similarly during rotation of the wheel 50, the sprocket 97 does not rotate.

Thus the cam disc 94 is returned to the same position after each actuating sequence ready for the detection of a further movement of the sensing wheel 50. The wheel 50 is only rotated when the column of bundles reaches the upper part of the chamber and the amount of rotation of the wheel 50 which takes place before the column reaches the top of the chamber is pre-determined. In addition adjustment of the movement of the cam disc can be achieved by changing the position of the chain 102 about the sprocket 97.

By these means the sequence during a baling operation is as follows. Assuming that the tail gate 51 is closed with the rear end of the bale being formed engaging the tail gate and final column of bundles being formed at the front end of the chamber, the sensor 63 will detect that the predetermined pressure has been reached. The sensor 63 transmits a signal to the knotting mechanism to effect a knotting operation but before this starts the sensor 50 has to indicate that the final column is complete. As soon as this is signalled the needles 45 begin to move towards the knotters 46 and the tines 31 are withdrawn from the chamber and reintroduced in front of the last column. The latter operation is completed just before the needles pass across the duct 20 to the knotters. At the start of this sequence the packing fingers 22 complete the introduction of the last bundle into the chamber for the final column to be completed and then withdraw from the duct and, by the time the needles are being withdrawn on completion of a knotting operation, the fingers 22 are moving up the duct with the first bundle of the first column of the next bale to be formed. As has been previously stated the initiation of movement of the needles releases the tail gate to allow the completed bale to begin movement out of the chamber before formation of the new bale.

As a further alternative the rear wall of the chamber may be formed by a movable wall which moves backwards as the bale chamber is filled and when the bale is completed the wall is raised clear of the rear end of the bale to allow it to be discharged.

The baling machine of the invention is capable of producing large rectangular bales having a relatively high and uniform density comparable with that achieved by conventional balers making small rectangular bales. Moreover the bales are made up of columns of material thereby enabling the bales to be readily broken down for use and affording air flow paths through the bales for drying purposes. The machine is relatively simple and has a relatively low power requirement.

What we claim as our invention and desire to secure by Letters Patent of the United States is:

1. A baling machine comprising a frame defining a bale chamber in which bales are to be formed, an entry opening at one end of the bale chamber, feed means for feeding material to be baled through the entry opening and for compressing the material during feeding, guide means locatable in the bale chamber adjacent the entry opening for constraining the material entering the chamber to pass along a wall of the chamber at said one end to form successive columns of the material, and drive means for moving the guide means in and out of the bale chamber so that when the guide means is positioned out of the bale chamber a column of material which lies against said wall can move towards the opposite end of the chamber, and upon re-entry of the guide means into the chamber the guide means is positioned between said wall and said column of material.

2. A machine according to claim 1 comprising support means for the guide means whereby the guide means effects limited movement away from said wall of the bale chamber after re-entry into the chamber.

3. A machine according to claim 1 wherein the support means includes a pivot means whereby the guide means is pivotally supported for said limited movement to take place by engagement of incoming material with the guide means, the guide means lying across the entry opening prior to said limited movement.

4. A machine according to claim 1 wherein the entry opening is formed in a lower side wall of the chamber towards one end thereof, the completed columns of material passing along said lower side wall with their lower ends supported thereby as successive columns are formed.

5. A machine according to claim 1 wherein the guide means is in the form of a row of tines each pivotable about one end for limited pivotal movement, the tines being resiliently urged towards a position at one end of their range of pivotal movement in which the tines can extend across the entry opening.

6. A machine according to claim 1 comprising drive means for the feed means which is synchronised with the drive means for the guide means so that the feed means is operable continuously during loading of the bale chamber.

7. A machine according to claim 1 comprising a discharge door constituting said opposite end of the bale chamber, the discharge door being closable to form an abutment during formation of the bales, and release means whereby the door is opened upon completion of a bale for discharge of the bale from the chamber.

8. A machine according to claim 7 comprising support means for the discharge door whereby the door is pivotably mounted about its lower edge to move to an intermediate position in which the completed bales can be supported on the door, and a downwardly inclined discharge position in which the bales can slide off the door.

9. A baling machine according to claim 1 wherein the frame is mounted for travel over the ground and the entry opening is at the lower forward side of the bale chamber so that the wall of the chamber against which new columns are formed is at the forward end of the chamber and the columns extend in a generally vertical direction.

10. A machine according to claim 1 comprising a sensor for sensing the completion of each column of material, the sensor being coupled to the drive means for the guide means to release said drive means for operation in synchronism with the operation of the feed means.

* * * * *